UNITED STATES PATENT OFFICE.

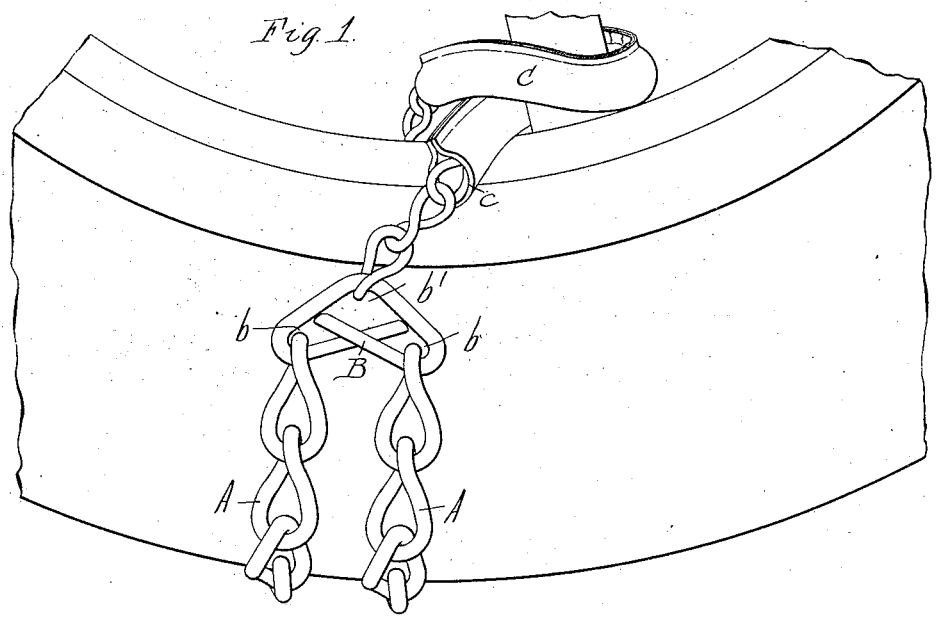
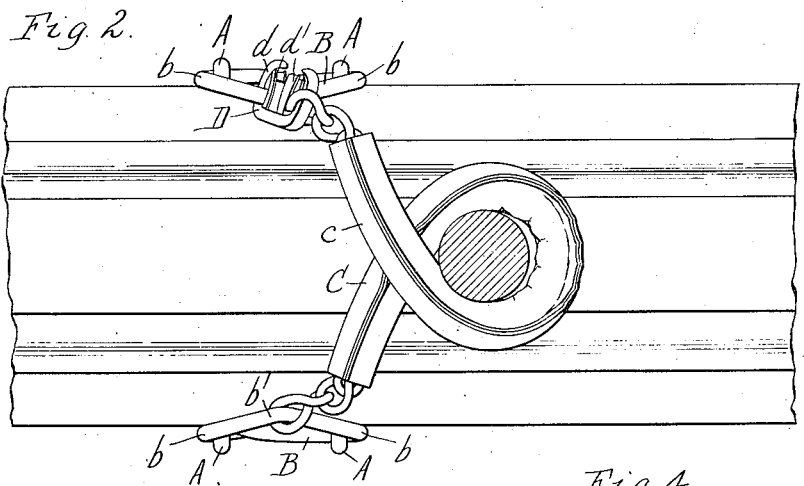
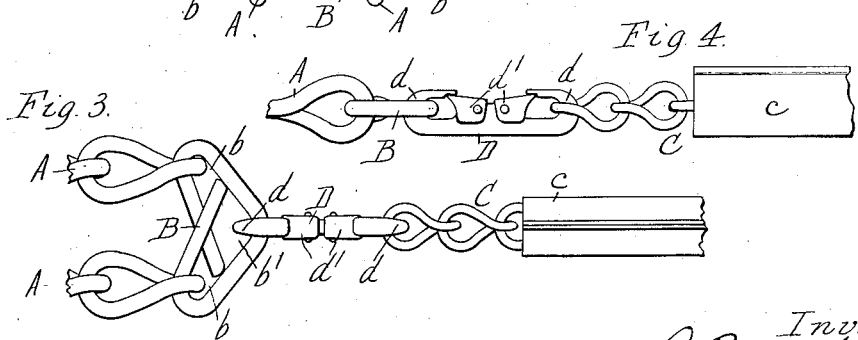

LACHLAN E. McKINNON, OF BUFFALO, NEW YORK.

EMERGENCY CHAIN ATTACHMENT FOR AUTOMOBILE-WHEELS.

1,179,733.                     Specification of Letters Patent.     Patented Apr. 18, 1916.

Application filed March 3, 1913. Serial No. 751,688.

*To all whom it may concern:*

Be it known that I, LACHLAN E. McKIN-NON, a citizen of the United States, residing at Buffalo, in the county of Erie and State of New York, have invented a new and useful Improvement in Emergency Chain Attachments for Automobile-Wheels, of which the following is a specification.

This invention relates to emergency chain attachments for automobile wheels of the kind which are adapted to be detachably secured to the spoke or rim of the wheel and extend across the outer or tread portion of the tire to prevent the tire from slipping. These attachments are intended to be quickly secured on the wheel in an emergency when it is found that the tire is slipping or is in danger of slipping on the road or pavement, and several attachments are generally arranged at intervals about the circumference of the wheel, so as to give the tire sufficient grip on the surface over which it travels.

The object of this invention is to provide an attachment of this kind of simple and inexpensive construction which can be easily and quickly secured in position on the wheel and which will effectually prevent the slipping of the tire and at the same time will not unduly strain nor injure the fabric of the tire which it engages.

In the accompanying drawings: Figure 1 is a fragmentary side elevation of an automobile wheel provided with an emergency chain attachment embodying the invention. Fig. 2 is a plan view thereof. Fig. 3 is a fragmentary plan view of the attachment detached from the wheel. Fig. 4 is a fragmentary side elevation thereof.

Like reference characters refer to like parts in the several figures.

The attachment comprises a chain portion which extends across the outer bearing face or tread portion of the tire, and an attaching portion which extends across the inner face of the rim of the wheel and holds the chain portion in place on the tire. The chain portion of the attachment consists of parallel chains A A, preferably two in number as shown, which are secured at their opposite ends in spaced loops $b$ $b$ of spacing members B arranged on opposite sides of the tire. The spacing members B are each provided with a central attaching portion $b'$, and an attaching member C is adapted to detachably connect the attaching portions of the spacing members across the rim of the tire. These spacing members may be constructed in any suitable manner. Those shown are each formed from a single piece or bar of metal which is bent into substantially triangular shape with its central portion forming the attaching loop $b'$, and its end portions bent inwardly to form the spaced end loops $b$ $b$. The end portions extend across each other with their ends abutting against the inner faces of the opposite inclined sides of the spacing member, so as to close the loops $b$ $b$ and separate these loops from each other and from the attaching loop $b'$. The ends of the chains secured in these different loops are thus prevented from coming into contact with one another.

The attaching member C, which connects the central attaching portion $b'$ of the spacing members B across the rim of the wheel, may be of any suitable construction and may be secured to the spacing members in any desirable manner. In the construction shown, this member consists of an attaching chain of suitable size which is inclosed throughout the greater portion of its length by a leather casing $c$ which prevents the chain from rubbing and marring the rim and spoke of the wheel. This chain is adapted to encircle the spoke of the wheel and has its end link at one end in direct engagement with the attaching portion $b'$ of one of the spacing members B, while at its opposite end it is detachably connected with the other spacing member by a hooked connection D having opposite end hooks $d$, one of which engages in the attaching portion of the spacing member, and the other in the end link of the chain. Spring guards $d'$ normally close the open ends of the hooks and prevent accidental detachment of the parts connected thereby. The attachment is simple and can be inexpensively manufactured as, aside from the chains which may be of standard size, the only parts required are the spacing members which can be easily and economically formed, and the hooked connection which may be of any standard make. The spacing members lie flat along the opposite sides of the tire and the attachment has no parts or projections which will tend to stick or dig into the tire, nor any parts which are liable to become broken or damaged in use. The attachment can be easily and quickly secured in place on the wheel, and as many attachments may be secured to the wheel as may be necessary or desired, not to exceed, however, for practical purposes the number of spokes in the wheel.

By connecting the attaching chain to the central attaching portion of the spacing members, the latter are free to turn or rock on their connections, so that they will tend to equalize the strains to which the chains A A are subjected, and prevent either chain from being subjected to excessive strain and from bearing with undue force upon the surface of the tire. The construction serves to distribute the strain between both chains, so that it will not fall upon either one alone, nor upon any single part of the tire. It also gives additional yielding and rocking movement to the chains, so that they can readily accommodate themselves to the surfaces over which they travel, so as to effectually grip the same. The flexible attaching chain permits the cross chains to shift their position to a limited extent circumferentially of the tire as the wheel revolves, so that the cross chains will not always be in engagement with the same portions of the tire and their wear will thus be somewhat distributed along the surface of the tire.

I claim as my invention:

1. An emergency chain attachment for automobile wheels comprising two substantially parallel chains adapted to extend across the tread portion of the tire of the wheel, spacing members arranged at opposite ends of said chains, each spacing member comprising a single rod shaped to form a central eye and two end eyes, said single rod having portions thereof crossing each other to completely close said central eye and the two end eyes, said chains being secured at their opposite ends in said end eyes and confined therein, and an attaching member detachably connecting the central eyes of said spacing members, substantially as set forth.

2. An emergency chain attachment for automobile wheels comprising two substantially parallel chains adapted to extend across the tread portion of the tire of the wheel, spacing members arranged at the opposite ends of said chains, each spacing member comprising a single piece of metal shaped to form a central attaching portion and corner loop portions, the opposite ends of said single piece of metal extending across each other and closing said corner loop portions, said chains being secured at their opposite ends in said corner loop portions, and an attaching member detachably connecting the attaching portions of said spacing members, substantially as set forth.

3. An emergency chain attachment for automobile wheels comprising two substantially parallel chains adapted to extend across the tread portion of the tire of the wheel, spacing members arranged at opposite ends of said chains, each spacing member comprising a central attaching portion and corner loop portions, the same being formed from a single piece of metal bent into substantially triangular shape with its opposite ends extending across each other and closing said corner loop portions, said chains being secured at their opposite ends in said corner loop portions, and an attaching member detachably connecting the attaching portions of said spacing members, substantially as set forth.

Witness my hand this 13th day of February, 1913.

LACHLAN E. McKINNON.

Witnesses:
R. A. McKINNON,
ELIZABETH M. FORBES.